United States Patent [19]

Erickson et al.

[11] Patent Number: 5,244,423
[45] Date of Patent: Sep. 14, 1993

[54] TURN PREVENTION ASSEMBLY FOR ELECTRICAL CONNECTION LUGS

[75] Inventors: John W. Erickson; James A. Erickson, both of Crystal Lake, Ill.

[73] Assignee: Boltswitch, Inc., Crystal Lake, Ill.

[21] Appl. No.: 875,291

[22] Filed: Apr. 29, 1992

[51] Int. Cl.⁵ .............................. H01R 11/09
[52] U.S. Cl. .................. 439/798; 439/805; 439/810; 439/814
[58] Field of Search ............... 439/212, 213, 711, 717, 439/796–798, 805, 810, 814

[56] References Cited

U.S. PATENT DOCUMENTS

| | | | |
|---|---|---|---|
| 970,087 | 9/1910 | Murray | 439/797 |
| 3,047,835 | 7/1962 | Kelley | 439/814 |
| 3,519,981 | 7/1970 | Koletsos et al. | 439/798 |
| 3,693,137 | 9/1972 | Brumfield | 439/798 |
| 5,000,705 | 3/1991 | Kinka et al. | 439/805 |
| 5,030,131 | 7/1991 | Boehm | 439/810 |

*Primary Examiner*—Paula A. Bradley
*Attorney, Agent, or Firm*—Kinzer, Plyer, Dorn, McEachran & Jambor

[57] ABSTRACT

A turn prevention electrical connection assembly to prevent cable or other conductor connection lugs from turning on an electrical bus includes a turn prevention member, usually of cross-like configuration and having at least as many arms as there are connection lugs on one side of the bus. The turn prevention member is mounted on the bus in nested alignment with the connection lugs so that each connection lug is aligned closely adjacent to at least one arm of the turn prevention member. The turn prevention member and the connection lugs interact with each other to preclude turning of the lugs from their preset alignment.

5 Claims, 3 Drawing Sheets

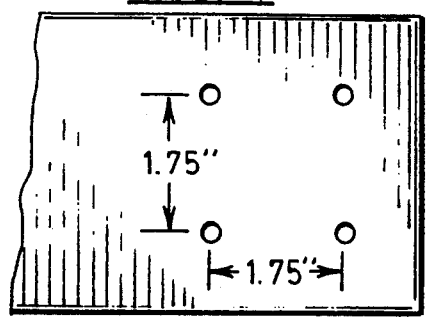 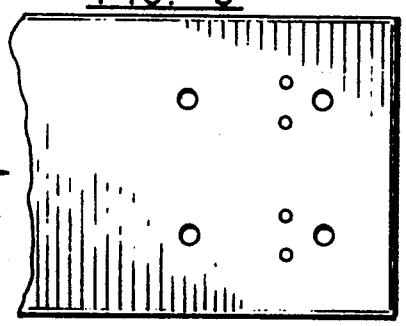
 
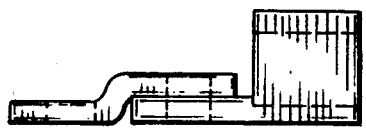 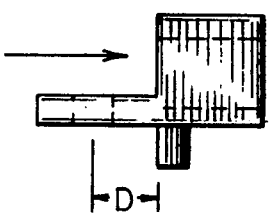
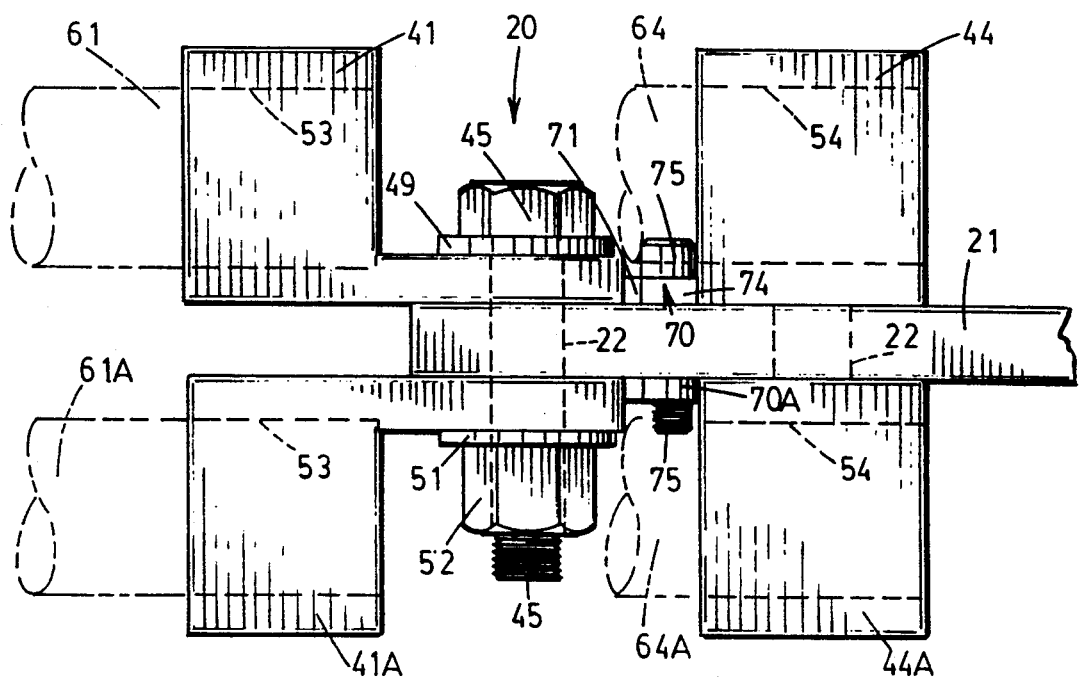

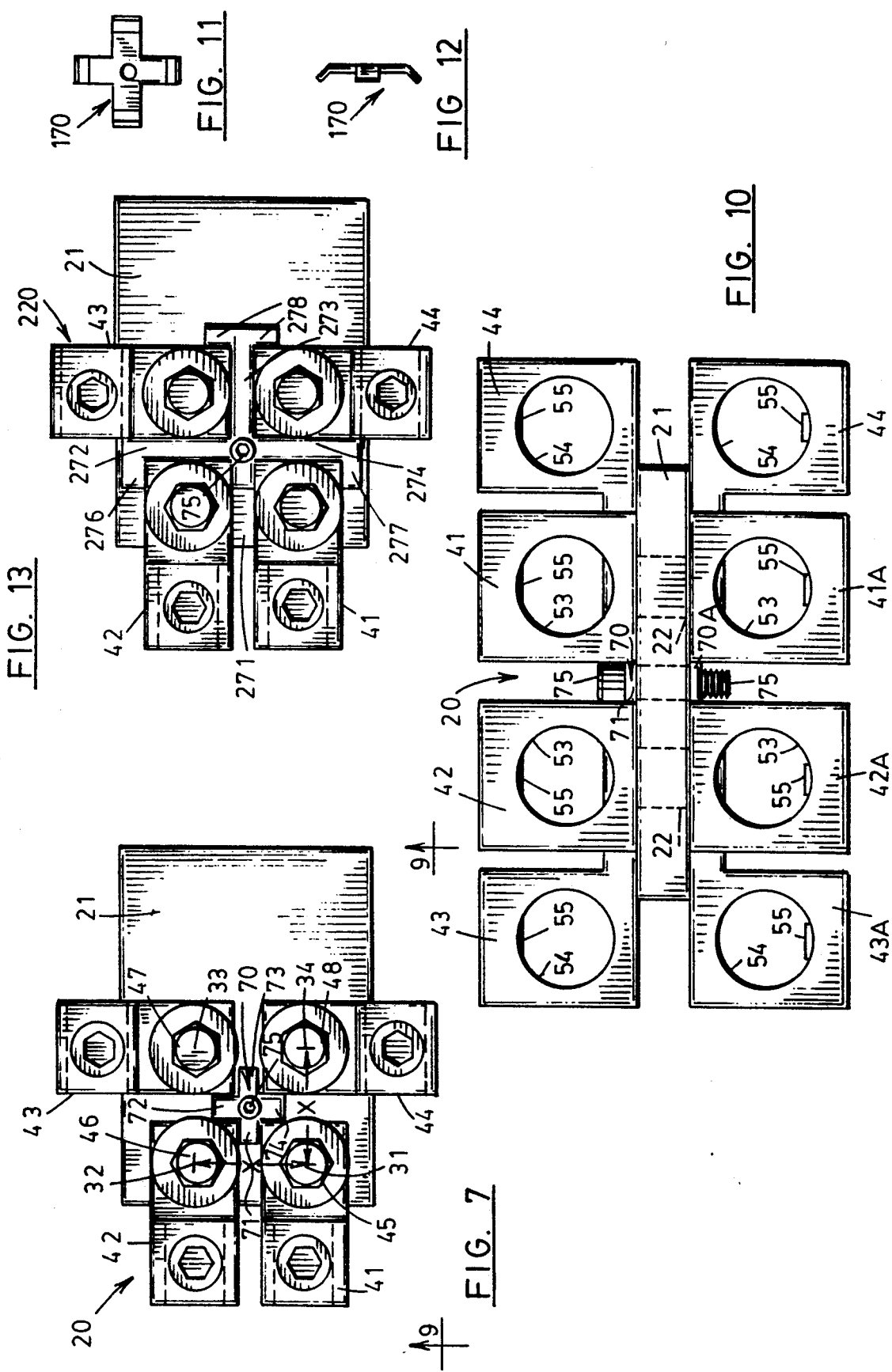

TURN PREVENTION ASSEMBLY FOR ELECTRICAL CONNECTION LUGS

BACKGROUND OF THE INVENTION

High current (800 to 6,000 ampere) electrical installations usually have one or more main bus bars with terminal ends that are provided with plural holes for connecting smaller feeder buses or electrical cables (conductors) to the main bus. The overall width of such a main bus typically is in a range of three and one-half to six inches. In the past, the patterns and spacings of these mounting holes or apertures used to affix electrical connection lugs to the main bus were determined solely by the manufacturers or designers of the electrical installations; variation was prevalent. This situation was changed by the National Electrical Manufacturers Association (NEMA), when it adopted a standard pattern comprising four mounting holes of 9/16 inch diameter centered at the corners of a square having sides of 1.75 inch length, as shown in FIG. 1. This NEMA standard for electrical connection lug mounting holes is used with half inch diameter mounting bolts. It is used on most high current switches.

An electrical connector lug having a single mounting hole, used in conjunction with just one of the bus mounting apertures, is the least expensive way to make electrical connections to a bus having mounting apertures arranged in the NEMA standard pattern, FIG. 1. But because such one-hole lugs are held in place by only one bolt, they can turn; they may thus become misaligned or even cause the secondary conductor to engage some component at a different electrical potential. The problems are substantial and potentially catastrophic. Consequently, many codes and standards prohibit the use of one-hole connection lugs without some means to prevent the lugs from turning. An obvious solution, of course, is to use two-hole lugs, as shown in FIG. 2. But this is a limiting arrangement; only two such connector lugs can be arranged side-by-side on a bus having the NEMA standard four-hole pattern, and the bus terminal requires twice as many bolts, nuts, and washers as are needed for one-hole lugs. The industry has not generally used two-hole connection lugs. Turn prevention clips, as illustrated in FIG. 3, have sometimes been used, but they have all of the disadvantages of two-hole connection lugs (FIG. 2) plus higher cost and poor appearance.

Turn prevention connection lugs as shown in FIG. 4 have been and are available; they have most frequently been utilized in mass produced products. The principal problem is that the dimension D may vary considerably, depending on the overall arrangement of the terminal portion of the main bus, so that a substantial number of different connector lugs is needed. Thus, these specialized connection lugs are not practical except in high volume applications. Of course, pins or nubs can be included in a terminal portion of a main bus, as shown in FIG. 5. But this makes it difficult or impossible to interconnect adjacent bus sections; the terminal portion of a main bus equipped with such pins is usually suitable only for cable connections. And additional costs can be substantial. Then too, a small hole through the connector lug aligned with a similar hole in the bus, and a pin in these holes, will prevent the lug from turning; see FIG. 6. This expedient has been and is used, but it requires two drilling operations and installation of a turn prevention pin for each connector lug, a lot of work and a lot of cost. Finally, multi-conductor terminals can be substituted for individual connector lugs, but this expedient is also unduly expensive.

SUMMARY OF THE INVENTION

It is a principal object of the invention, therefore, to provide a new and improved electrical connector turn prevention assembly to connect plural conductors to an electrical bus, using one-hole connector lugs, that is simple, inexpensive, and reliable.

A specific object of the invention is to provide a new and improved electrical connector turn prevention assembly for connecting plural cables or other conductors to a main electrical bus that is readily usable with the NEMA connector lug mounting hole standard and requires minimum modification of the terminal portion of the main bus.

Accordingly, the invention relates to a turn prevention electrical connector assembly for connecting a plurality of conductors to one surface of an electrical bus having a plurality of electrical connection lug mounting apertures, each adapted to receive a lug mounting device, arranged in a preselected pattern. The assembly comprises a plurality of electrical connector lugs, one for each conductor, a plurality of lug mounting devices, one for each connector lug, each lug mounting device projecting into one mounting aperture and mounting one connector lug on the one surface of the electrical bus, and a turn prevention member having plural arms projecting from a center hub. There are turn prevention member mounting means for mounting the turn prevention member on the one surface of the electrical bus with each arm of the turn prevention member aligned closely adjacent to one side of each connector lug, the turn prevention member and the connector lugs conjointly precluding turning of the lugs on the surface of the bus.

BRIEF DESCRIPTION OF THE DRAWINGS

FIGS. 1-6 all pertain to the prior art and are discussed above in regard to the background of the invention; FIGS. 2-4 and 6 are drawn to a larger scale than FIGS. 1 and 5.

FIG. 1 is a plan view of a NEMA standard electrical bus connection lug aperture pattern;

FIG. 2 is a plan view of a two-hole connector lug;

FIG. 3 is an elevation view of a connector lug and two-hole turn prevention clip assembly;

FIG. 4 is an elevation view of a one-hole turn prevention connection lug;

FIG. 5 is a plan view of a modified electrical bus with integral turn-prevention pins;

FIG. 6 is a plan view of a one-hole connector lug with a turn prevention pin;

FIG. 7 is a plan view of a turn prevention assembly according to one embodiment of the invention;

FIG. 9 is a side elevation view of the assembly of FIG. 8;

FIG. 10 is an end elevation view of the assembly of FIGS. 8 and 9;

FIGS. 11 and 12 are detail views, plan and elevation, of a component usable in the assembly of FIGS. 7-10;

FIG. 13 is a plan view of a turn prevention assembly according to another embodiment of the invention.

DESCRIPTION OF THE PREFERRED EMBODIMENTS

Figure 8:
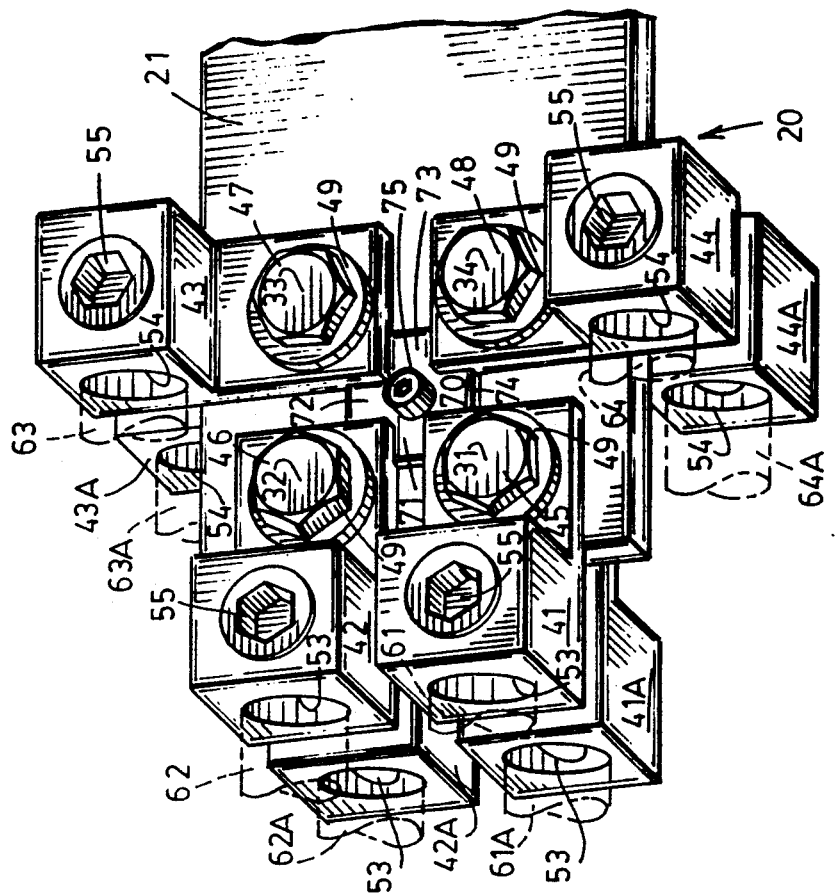
FIG. 8 is a perspective view of a two-sided version of the assembly of FIG. 7.

FIG. 7 affords a plan view of a turn prevention electrical connector assembly 20 for connecting four individual conductors or cables to one side of a bus bar 21. This plan view would be the same for an assembly connecting eight individual conductors to bus 21 if four were connected to the top surface of the bus bar and four to the bottom surface of bus 21. The left-hand end of bus 21, as seen in FIG. 7, has a square, four-hole pattern of mounting apertures, preferably the NEMA standard shown in FIG. 1. The mounting holes themselves are not visible in FIG. 7 but the mounting aperture centers are indicated at points 31,32,33 and 34; the pattern of mounting aperture centers 31-34 is a square and, in the NEMA standard, each spacing X is 1.75 inches. FIG. 8 is a perspective view of assembly 20 in a two-sided version for connecting eight conductors to bus 21; FIGS. 9 and 10 afford side and elevation views, respectively, of that dual-sided embodiment of the invention. Some of the connection lug apertures 22 are shown in FIGS. 9 and 10.

In assembly 20, FIGS. 7-10, there are four electrical connection lugs 41,42,43 and 44 on the top side of bus 21, secured to the bus by four lug mounting bolts 45,46,47, and 48, respectively. Half-inch bolts are most frequently used if NEMA standard mounting dimensions are employed. There is a washer 49 under the head of each lug mounting bolt, engaging the upper surface of a part of the associated electrical connection lug. Each lug mounting bolt is also encompassed by a second washer 51 and a nut 52 on the other side of bus bar 21; in a double-sided connection assembly, as shown in FIG. 9, washer 51 engages another electrical connection lug 41A located immediately below and aligned with lug 41. Thus, each lug mounting bolt 45-48 extends through one mounting aperture 22 in bus 21 and is combined with two washer 49 and 51 and a nut 52 to mount one connection lug on one side of bus 21 or to mount two lugs on opposite sides of the bus.

Each of the electrical connection lugs 41-44 (and 41A-44A in the double-side embodiment) is of standard construction, with an aperture 53 or 54 for receiving a conductor through a part of the lug and a set screw 55 in that same part of the lug to secure the cable or other conductor in place in the lug. Connector lugs 41 and 42 are of the straight wire connection type with apertures 53 extending longitudinally through part of the lug. Connector lugs 43 and 44 are of the side winder type; their conductor connection apertures 54 are at right angles to the long dimension of each lug. All are conventional lug types, each with just one mounting bolt securing the lug to bus bar 21. Connector lugs 41A and 42A are also of the straight connection kind, whereas lugs 43A and 44A are sidewinder connector lugs. Eight cables or other conductors 61-64 and 61A-64A are shown in phantom in FIG. 8, one conductor mounted in each connector lug.

The part of assembly 20 on the top surface of bus 21, as seen in FIGS. 7-10, includes a cross-shaped turn prevention member 70 that has a plurality of arms; in this embodiment the turn prevention member 70 has four arms 71,72,73 and 74 that project outwardly from a central hub with adjacent arms oriented at 90° to each other. Member 70 is affixed to bus bar 21 at the hub or center of the connection lug mounting aperture pattern 31-34 by a mounting screw or bolt 75. When the NEMA standard for the lug mounting apertures is employed, the cross-shaped member 70 may typically have an overall length across arms 71,73 (or arms 72,74) of 1.18 inch and an arm width of 0.375 inch; appreciable variation is permissible. Arm 71 is interposed between and aligned closely adjacent to the sides of connection lugs 42 and 42, arm 72 extends between and is closely aligned with lugs 42 and 43, arm 72 projects between and is aligned with or engages lugs 43 and 44, and arm 74 extends between and is closely aligned with lugs 44 and 41. Thus, member 70 is mounted in assembly 20 so that each of its arms 71-74 is aligned closely adjacent to or in engagement with one side of each of two connection lugs. A like cross-shaped turn prevention member 70A is mounted on bolt 75 on the other side of bus 21 in the dual-sided embodiment, as best shown in FIGS. 9 and 10. The illustrated construction uses members 70 and 70A having threaded apertures to receive bolt 75; if smooth-bore apertures are employed in members 70 and 70A, a nut is required on the lower part of the bolt. A lock nut is best. In either arrangement, washers may be used.

A variant form 170 of the cross-shaped turn prevention member, usable in either single-sided or double-sided versions of the assembly 20 of FIGS. 7-10, is shown in plan in FIG. 11 and in elevation in FIG. 12. Member 170 can be shaped from ordinary sheet metal, preferably with an anti-corrosion plating. Member 70, FIGS. 7-10, may be made of 12 gauge steel, again preferably plated.

With either form of turn prevention member, 70 or 170, the connection lugs 41-44 and the turn prevention member interact conjointly to preclude turning of the lugs from their predetermined alignment, as illustrated, with all of the conductors 61-64 essentially parallel to each other. The turn prevention member, whether the cross-shaped member 70 on the similar member 170, cannot do the job alone; it has only the one mounting member, bolt 75, and hence is itself inherently rotatable. The connection lugs 41-44 cannot prevent turning by themselves; each has but one mounting member 45-48 and thus is inherently rotatable. But these elements, each rotatable on the top surface of bus 21, cooperate with each other to preclude rotation conjointly. The turn prevention members 70 and 170 themselves are simple and inexpensive, and only minimal work is required to mount them on bus 21 (a hole for bolt 75). Yet assembly 20 is reliable and effective and can be used for both one-sided and two-sided bus terminal connections.

Figure 14:
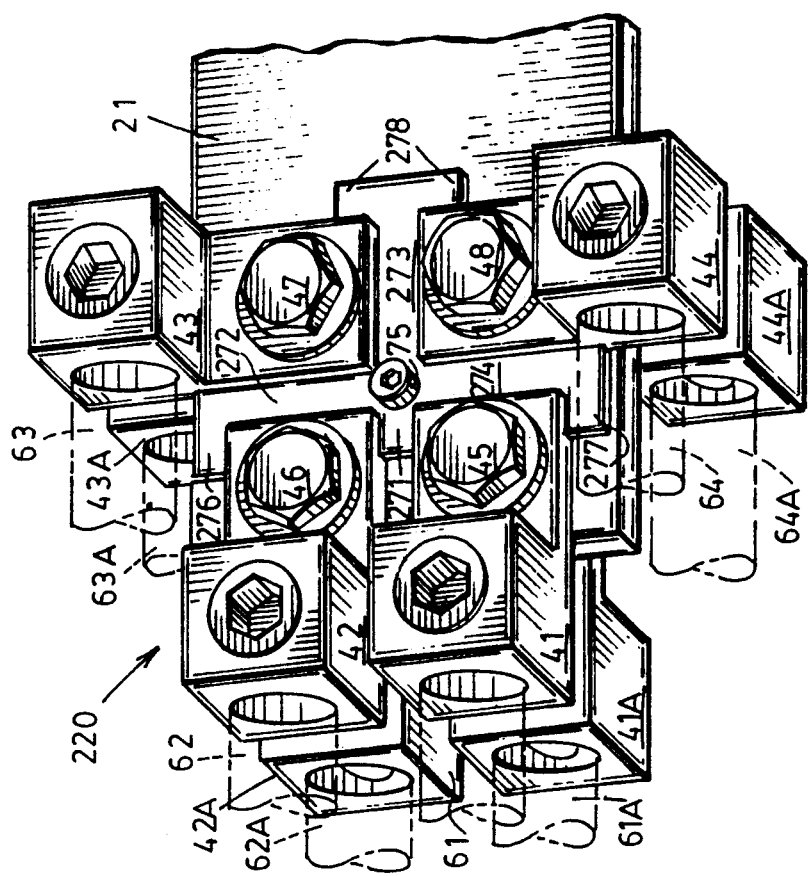
FIG. 14 is a perspective view of a two-sided version of the assembly of FIG. 11.

The turn prevention electrical connector assembly 220 of FIGS. 13 and 14 is the same as assembly 20, FIGS. 7-10, except for the shape of its turn prevention member 270. As before, the turn prevention member is generally cross-shaped. Indeed, the arm 271 between connectors 41 and 42 may be the same as arm 71 in the previously described embodiment. But the arm 272 between connector lugs 42 and 43 is longer and ends with a lateral extension 276; similarly, the arm 274 between connector lugs 44 and 41 is longer than in the assembly 20 and ends in a lateral extension 277. The remaining arm 273 of member 270, disposed between the two sidewinder connector lugs 43 and 44, is also longer than before and ends in a T configuration as indicated at 278. Member 270, like member 70, is preferably made of plated 12 gauge steel. It affords improved turn prevention security but does increase the cost somewhat. Because overall operation is the same, further description is unnecessary.

It will be recognized that variations of the described embodiments may be adopted, particularly if the number of cable or other conductor connections to the main bus 21 changes. Thus, if only three conductor connections are needed, one of the connection lugs (e.g., lug 44) can be eliminated, but the cross-shaped turn prevention member (70,170 or 270) need not be changed. For a two-conductor connection, two lugs (e.g., 43 and 44) would be eliminated. For this limited and unlikely arrangement a T-shaped turn prevention member, having legs 71,72 and 74 (or 271,272 and 274) could be used, but the complete cross-shaped member would probably be no more expensive. Of course, there may be two, three, or four lug connections on one side of bus 21 and three or four on the other side; the turn prevention assembly works equally well for all of these.

We claim:

1. A turn prevention electrical connector assembly for connecting a plurality of conductors to one surface of an electrical bus having a plurality of electrical connection lug mounting apertures, each adapted to receive a lug mounting device, arranged in a preselected pattern, the assembly comprising:
   a plurality of electrical connector lugs, one for each conductor;
   a plurality of lug mounting devices, one for each connector lug, each lug mounting device projecting into one mounting aperture and mounting one connector lug on the one surface of the electrical bus;
   a turn prevention member having plural arms projecting from a center hub;
   and turn prevention member mounting means for mounting the turn prevention member on the one surface of the electrical bus with each arm of the turn prevention member aligned closely adjacent to one side of each connector lug,
   the turn prevention member and the connector lugs conjointly precluding turning of the lugs on the surface of the bus.

2. A turn prevention assembly for connecting a plurality of electrical conductors to one side of an electrical bus, according to Claim 1, in which:
   the bus has four mounting apertures arranged in a rectangle; and
   the turn prevention member has four arms arranged in a cross-shaped configuration.

3. A turn prevention assembly for connecting a plurality of electrical conductors to one side of an electrical bus, according to claim 2, in which the outer end of each of at least two arms of the turn prevention member comprises a projection at 90° to the arm.

4. A turn prevention assembly for connecting a plurality of electrical conductors to one side of an electrical bus, according to Claim 3, in which the turn prevention member is formed of plated steel.

5. A turn prevention assembly for connecting a plurality of electrical conductors to one side of an electrical bus, according to claim 1, in which the turn prevention member is formed of plated steel.

* * * * *